No. 816,287. PATENTED MAR. 27, 1906.
D. AUER.
SPIKE PULLER.
APPLICATION FILED APR. 19, 1905.
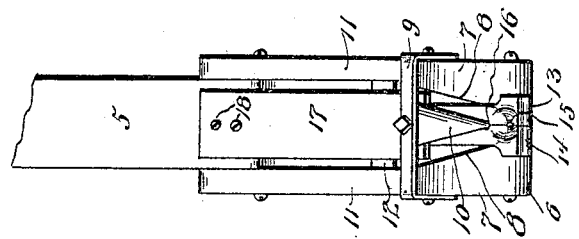
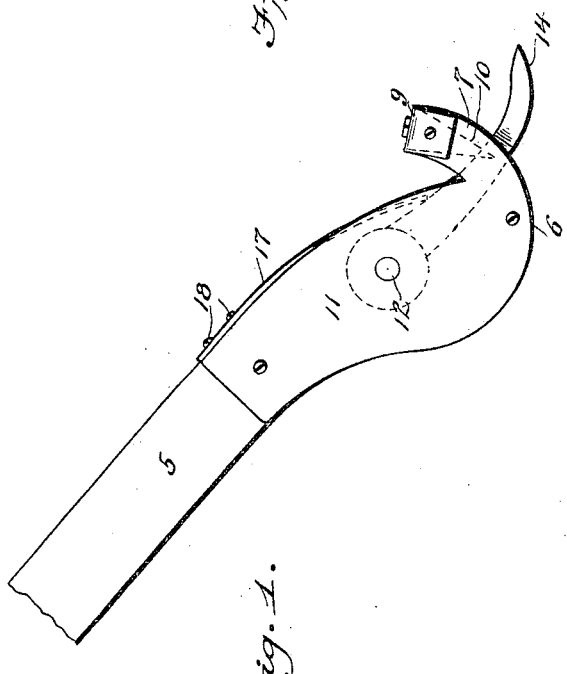
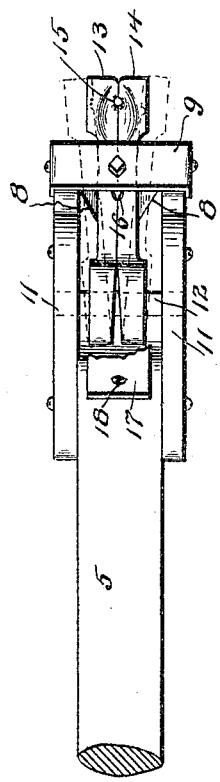
Witnesses
O. E. Murray.
M. A. Schmidt.
David Auer Inventor
by Milo B. Stevens and Co.
Attorneys

UNITED STATES PATENT OFFICE.

DAVID AUER, OF MILAN, MISSOURI.

SPIKE-PULLER.

No. 816,287.  Specification of Letters Patent.  Patented March 27, 1906.

Application filed April 19, 1905. Serial No. 256,343.

To all whom it may concern:

Be it known that I, DAVID AUER, a citizen of the United States, residing at Milan, in the county of Sullivan and State of Missouri, have invented new and useful Improvements in Spike-Pullers, of which the following is a specification.

My invention is a spike-puller, and has for its object certain novel features of construction hereinafter described and claimed.

The present invention is characterized by a lever carrying a claw to engage the spike or nail, said claw being made in two pieces which are arranged to open, so as to permit a new hold to be taken on the spike or nail.

In the accompanying drawings, Figure 1 is a side elevation of the implement, and Fig. 2 is a front elevation thereof. Fig. 3 is a top plan view.

Referring specifically to the drawings, 5 denotes a hand-lever having the usual curved lower end 6, which forms the fulcrum. Said end is also turned up, as at 7, in which a notch is made having converging sides 8. A bar 9 extends across the parts 7, to which bar a depending wedge-shaped pin 10 is secured which extends into the notch and is for a purpose to be hereinafter described. The lower end of the lever is also formed on opposite sides with cheeks 11, between which a pivot-pin 12 extends and is secured. The claw is in two pieces 13 and 14, respectively, and is mounted on the pivot-pin 12. The two claw members extend through the notch and beyond the end of the lever. Their inner edges are notched at 15, in which the spike fits, and also at 16, into which the point of the pin 10 extends. A strong flat spring 17 is secured to the lever at 18 and bears on the claw members to normally hold them down.

The operation of the implement is as follows: Upon bearing down on the claw members they are forced upwardly, with the pin 10 extending between them, which causes them to spread out laterally, as shown by dotted lines in the drawings. The claw members have sufficient play on the pivot-pin 12 to permit this lateral movement. Upon removing the pressure on the claw members they close up under the pressure of the spring. The lever is now swung on its fulcrum, as usual, to pull the spike. Upon bearing down on the lever the claw members are forced down in the notch, which by reason of the wedge action of the converging sides 8 thereof presses claw members together against the spike to firmly grip the same. Upon bearing down on the claw members as before they open up again and a new hold can be taken on the spike. This construction enables the implement to pull long spikes or nails and also spikes or nails without heads.

Having thus described my invention, what is claimed as new, and desired to be secured by Letters Patent, is—

A spike-puller comprising a lever having a curved upturned lower end, provided with a notch having converging sides; a bar extending across the notch; a pair of claw members pivoted to the lever, and extending through the notch and beyond the end of the lever; and a wedge secured to the aforesaid bar, and extending between the claw members.

In testimony whereof I have signed my name to this specification in the presence of two subscribing witnesses.

DAVID AUER.

Witnesses:
J. M. WATTENBARGER,
F. S. LEACH.